United States Patent
Zatsman

[11] Patent Number: 6,144,413
[45] Date of Patent: Nov. 7, 2000

[54] SYNCHRONIZATION SIGNAL DETECTION AND PHASE ESTIMATION APPARATUS AND METHOD

[75] Inventor: Alex Zatsman, Newton, Mass.

[73] Assignee: Analog Devices, Inc., Norwood, Mass.

[21] Appl. No.: 09/104,936

[22] Filed: Jun. 25, 1998

[51] Int. Cl.[7] .................................................. H04N 5/08
[52] U.S. Cl. ........................ 348/525; 348/526; 375/368
[58] Field of Search .................................. 375/355, 362, 375/364, 365, 368; 348/470, 471, 472, 495, 496, 500, 513, 514, 525, 526, 527, 529, 532, 536, 537; 358/153; H04N 5/04, 5/08

[56] References Cited

U.S. PATENT DOCUMENTS

| | | |
|---|---|---|
| 5,506,636 | 4/1996 | Patel et al. . |
| 5,534,938 | 7/1996 | Citta et al. ............................... 348/495 |
| 5,548,339 | 8/1996 | Kim . |
| 5,596,582 | 1/1997 | Sato et al. ............................... 375/368 |
| 5,602,595 | 2/1997 | Citta et al. . |
| 5,949,834 | 9/1999 | Laud et al. ............................... 375/368 |
| 5,959,682 | 9/1999 | Kim et al. ............................... 348/511 |
| 6,014,416 | 9/1999 | Shin et al. ............................... 375/368 |

OTHER PUBLICATIONS

James C. McKinney and Dr. Robert Hopkins, *Guide to the use of the ATSC Digital Television Standard*, Doc. A/54, Apr. 12, 1995, Oct. 4, 1995.

James C. McKinney and Dr. Robert Hopkins, ATSC Digital Television Standard, Doc. A/53, Apr. 12, 1995, Sep. 16, 1995.

*Primary Examiner*—David E. Harvey
*Attorney, Agent, or Firm*—Samuels, Gauthier & Stevens, LLP

[57] ABSTRACT

A digital television (DTV) receiver receives a data signal that is divided into a plurality of segments each separated by a known data segment sync sequence. The receiver includes a data segment sync signal detector that receives the data signal and filters the signal to provide a filtered data signal. The detector computes the difference between samples of the filtered data signal and an average expected filtered signal value that is representative of a nominal filtered signal value in the middle of the segment sync sequence. The detector then computes the absolute value of the computed difference, and the resultant absolute value is summed with a sampled value from the previous segment and the summed value is stored into an accumulator. The process is repeated for several segments. The location of the data segment sync sequence within the segment is determined by comparing the summed values to determine the smallest summed value, which represents the center of the segment sync sequence. Filtering the data signal with a filter provides a filtered data signal that facilitates accurate detection of the data segment sync sequence and computation of an initial estimate of the sampling phase.

20 Claims, 5 Drawing Sheets

SYNCHRONIZATION SIGNAL DETECTION AND PHASE ESTIMATION APPARATUS AND METHOD

BACKGROUND OF THE INVENTION

The invention relates to the field of digital communications, and in particular to a sync signal detector and a phase estimator for use in a digital television (DTV) receiver.

Within a few months television in North America will undergo a change as fundamental and sweeping as the advent of color. In November, 1998 broadcasters in large metropolitan areas will begin digital broadcasts which promise much sharper picture and sound than current systems provide. Called digital television (DTV), formerly referred to as high definition television "HDTV", the new system also has many features that are absent from conventional broadcasting, such as auxiliary channels for data and easy connection to computers in telecommunication networks.

The changeover from the current analog system to the new digital form has taken a number of years due to a need for uniformity on the system standards. Government officials, broadcasters and television manufacturers (collectively the "Grand Alliance") worked together to come up with a digital standard that would not render existing TV's immediately obsolete.

The system which the Grand Alliance decided upon transmits high quality video and audio data over a single 6 MHz channel. The system can deliver reliably about 19 MBPS of throughput in a 6 MHz terrestrial broadcasting channel and about 38 MBPS of throughput in a conventional cable television channel.

Now that the functional system level architecture has been selected by the Grand Alliance, the next step is to design and provide a low cost, reliable commercially realizable receiver that is compatible with the system level architecture defined by the Grand Alliance. This includes providing detector circuitry that accurately detects a data segment sync signal that separates packets of data in the data signal.

SUMMARY OF THE INVENTION

An object of the present invention is to provide a data segment sync signal detector.

Another object is to accurately detect a data segment sync signal within an encoded DTV signal.

A further object is to accurately detect a data segment sync signal within an encoded DTV signal and provide an initial phase estimate for use in sampling the encoded DTV signal.

Briefly, according to the present invention, a receiver receives a data signal that is divided into a plurality of segments each separated by a known data segment sync sequence. The receiver includes a data segment sync signal detector that receives the data signal and filters the signal to provide a filtered data signal. The detector computes the difference between samples of the filtered data signal and an average expected filtered signal value that is representative of a nominal filtered signal value in the middle of the segment sync sequence. The detector then computes the absolute value of the computed difference, and the resultant absolute value is summed with a value from the previous segment and the summed value is stored into an accumulator. The process is repeated for a plurality of segments. The location of the data segment sync sequence within the segment is determined by comparing the summed values to determine the smallest summed value, which represents the center of the segment sync sequence.

The data segment sync sequence has a known length, and the beginning of the sync sequence is computed by subtracting an offset from the smallest summed value.

According to another aspect of the invention, upon detecting the location of the data segment sync sequence within the filtered data signal, the data segment sync signal detector computes an initial phase estimate and adjusts the sampling phase of an analog-to-digital converter (ADC) which samples the data signal.

Once the data segment sync sequence is detected and the initial estimate of the sampling phase is computed, the phase estimates are regularly computed to adjust the sampling phase of the ADC as necessary.

Advantageously, filtering the data signal provides a filtered data signal that facilitates accurate detection of the data segment sync sequence.

These and other objects, features and advantages of the present invention will become apparent in light of the following detailed description of preferred embodiments thereof, as illustrated in the accompanying drawings.

DETAILED DESCRIPTION OF THE INVENTION

Figure 1:
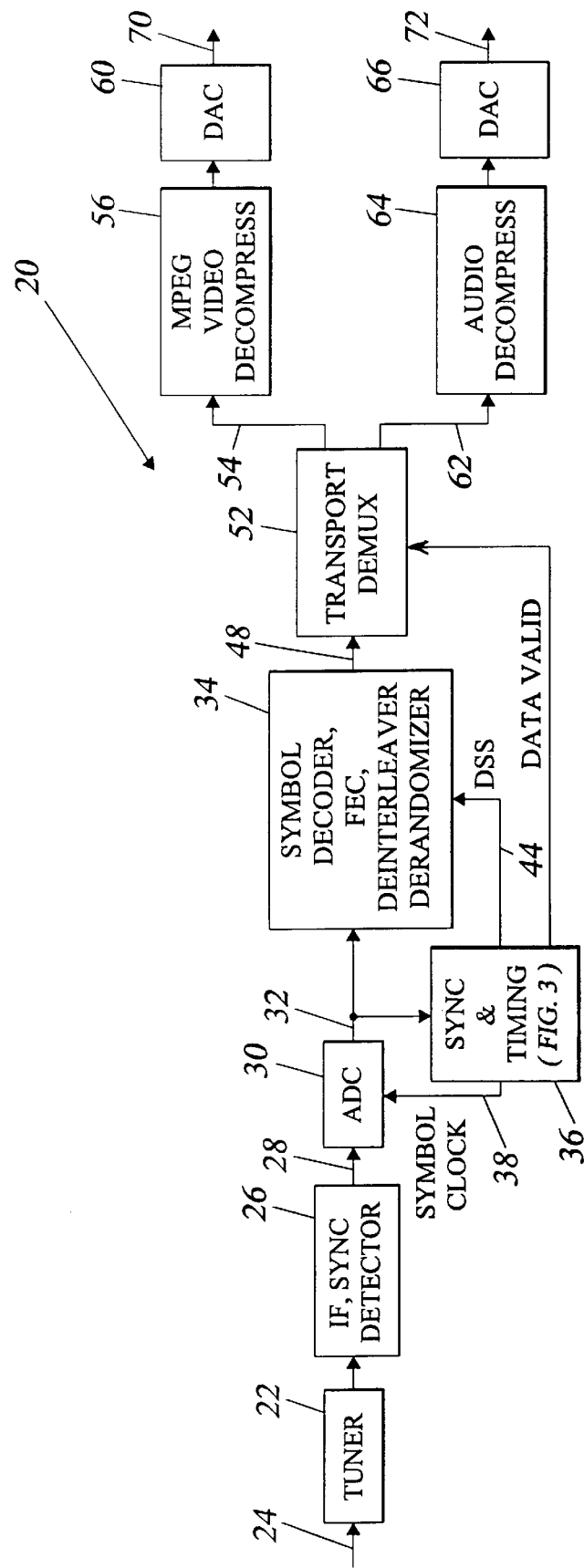
FIG. 1 illustrates a functional block diagram of a DTV receiver.

FIG. 1 illustrates a functional block diagram of a digital television (DTV) receiver 20. The receiver 20 includes a tuner 22 that receives a data signal on a line 24. The tuner 24 processes the data signal received from a transmitter (not shown) and supplies it to an IF synchronous detector 26. The detector 26 provides a signal on a line 28 to an analog-to-digital converter (ADC) 30 that provides a digitized signal on a line 32 to a symbol decoder 34. The signal on the line 32 is also routed to a sync and timing circuit 36 where repetitive synchronous data segments are detected. The sync and timing circuit 36 provides a symbol clock signal on a line 38 to the ADC 30. The overall DTV system architecture, including the system level requirements for the receiver are discussed in the publications "*ATSC Digital Television Standard*" and "*Guide to the use of the ATSC Digital Television Standard*", both published by the "Grand Alliance" and incorporated herein by reference.

Figure 2:
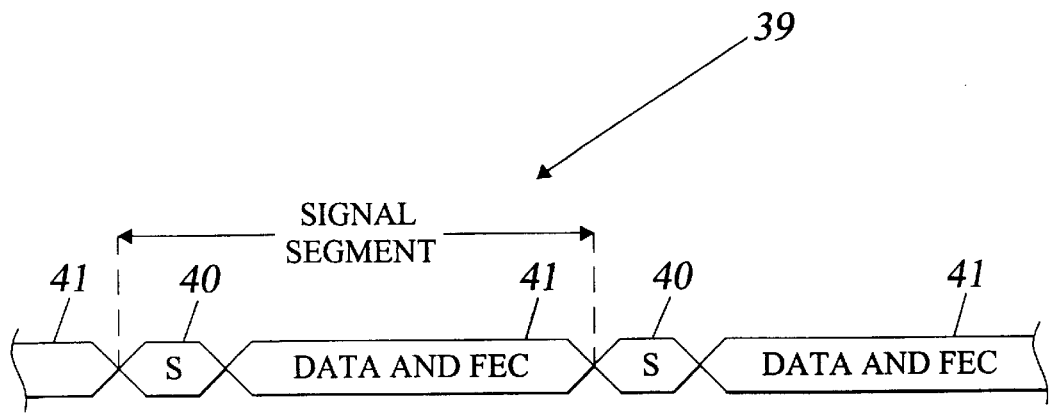
FIG. 2 illustrates a plot of a signal segment.

FIG. 2 illustrates a plot of a portion 39 of the data signal on the line 32 formatted for use in a digital television (DTV) system. The signal includes segment synchronous (sync) signals 40 that separate data fields 41 which include forward error correction (FEC) information. The purpose of these segment sync signals is to facilitate the detection of the start of the data fields 41 and maintain the correct sampling phase (i.e., control the ADC sampling phase). For one signal type, a complete segment includes 832 symbols, four symbols for the segment sync signal and 828 for the data plus parity symbols. The segment sync signal 40 is a two-level signal (i.e., binary) that occurs every 77.3 μsec. The present invention is directed to a method and apparatus for accurately detecting the segment sync signals 40 and estimating the ADC sampling phase.

Referring again to FIG. 1, the symbol clock signal on the line 38 has an adjustable phase that is controlled by the sync and timing circuit 36. The sync and timing circuit 36 provides a data segment sync (DSS) on a line 44 to the symbol decoder 34. The symbol decoder 34 also performs forward error correction (FEC), deinterleaving and derandomizing, and provides a signal (i.e., MPEG data) on a line 48 to a transport demux circuit 52 that separates the audio and video signals.

Video signals are routed on a line 54 to an MPEG video decompression circuit 56 which decompresses the video signal and provides a decompressed signal to a digital-to-analog converter 60 (DAC). The transport demux circuit 52 provides audio signals on a line 62 to an audio decompression circuit 64 that routes the resultant decompressed audio signal to a digital-to-analog converter 66 (DAC). The resultant video and audio signals are output on lines 70, 72, respectively. According to the present invention, the robust segment sync signal detector 36 accurately detects the segment sync signal 40 (FIG. 2) within the digitized signal 32 (FIG. 2).

Figure 3:
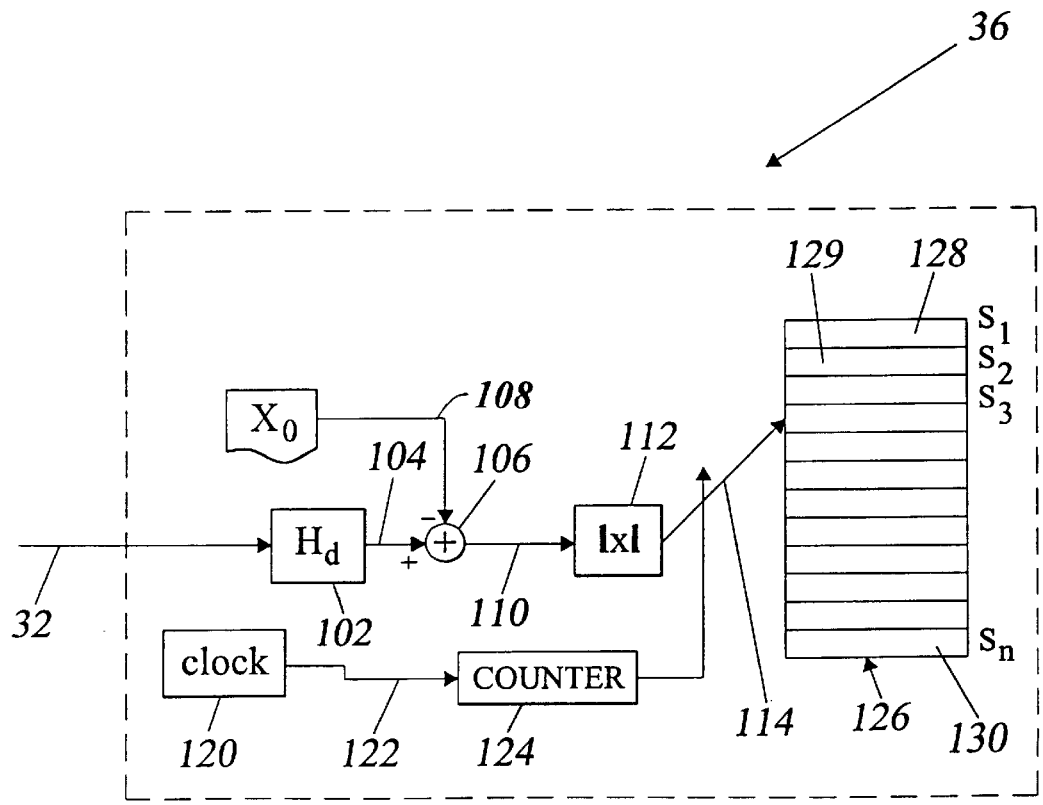
FIG. 3 illustrates a functional block diagram of a data segment sync signal detector.

FIG. 3 illustrates a functional block diagram of the segment sync signal detector 36. The detector 36 is preferably located on a single integrated circuit (IC), and the processing associated with the detector may be performed with detector circuitry on the IC or with a CPU which runs executable program instructions. The detector 36 receives the digitized signal on the line 32 that is input to a filter 102. The details of the filter 102 shall be discussed herein below. The filter provides a signal on a line 104 to a summer 106 that computes the difference between the signal on the line 104 and a signal on a line 108. The signal on the line 108 is representative of an average expected signal value $X_o$ indicative of the nominal value in the middle of the segment sync signal of the filtered signal. The summer 106 provides a signal on a line 110 to an absolute value function 112 that provides a signal on a line 114 indicative of the absolute value of the signal on a line 110. The detector 36 also includes a clock circuit 120 which provides a clock signal on a line 122 to a modulo counter which selects/controls the current memory storage location.

An accumulator 126 (e.g., an electronic memory device) includes a plurality of storage locations 128–130 (e.g., 832) for storing the signal values for further processing. The accumulator 126 preferably includes a plurality of storage locations equal to the number of symbols within one full signal segment. One of ordinary skill will recognize that less memory may be used. However, it is contemplated that using less memory may lead to longer computational times. A counter 124 controls which location in the accumulator 126 is associated with the present value of the signal on the line 114. Specifically, the present value of the signal on the line 114 is summed with the value stored in the selected accumulator location, and the resultant sum is stored in the selected accumulator location.

Mathematically, the operation of the detector 36 can be expressed as:

$$S_n = \sum_{k=0}^{K} |X_{n+kN} - x_0| \quad \text{(Eq. 1)}$$

where:
$S_n$=the signal value stored in the accumulator;
$X_{n+kN}$=the signal value on the line 104 (FIG. 3);
n=an index value indicative of the sampled value location in the segment and the location of the sampled value in the accumulator;
$X_0$=the nominal signal value in the middle of the filtered segment sync signal on the line 104 (FIG. 3); and
K=the number of signal segments.

Significantly, to determine the location of the segment sync signal 40 in the signal segment, the smallest value stored in the plurality of locations in the accumulator 126 is located. That is, each of the $S_n$ values is compared to determine the smallest value.

Specifically, the smallest value is representative of the center of the segment sync signal 40 (FIG. 2). Since the segment sync signal has a known fixed length, an offset is subtracted from the location of the smallest value to determine the location of the segment sync signal 40. Similarly, the starting point of the data field 41 is also easily located.

Figure 4:
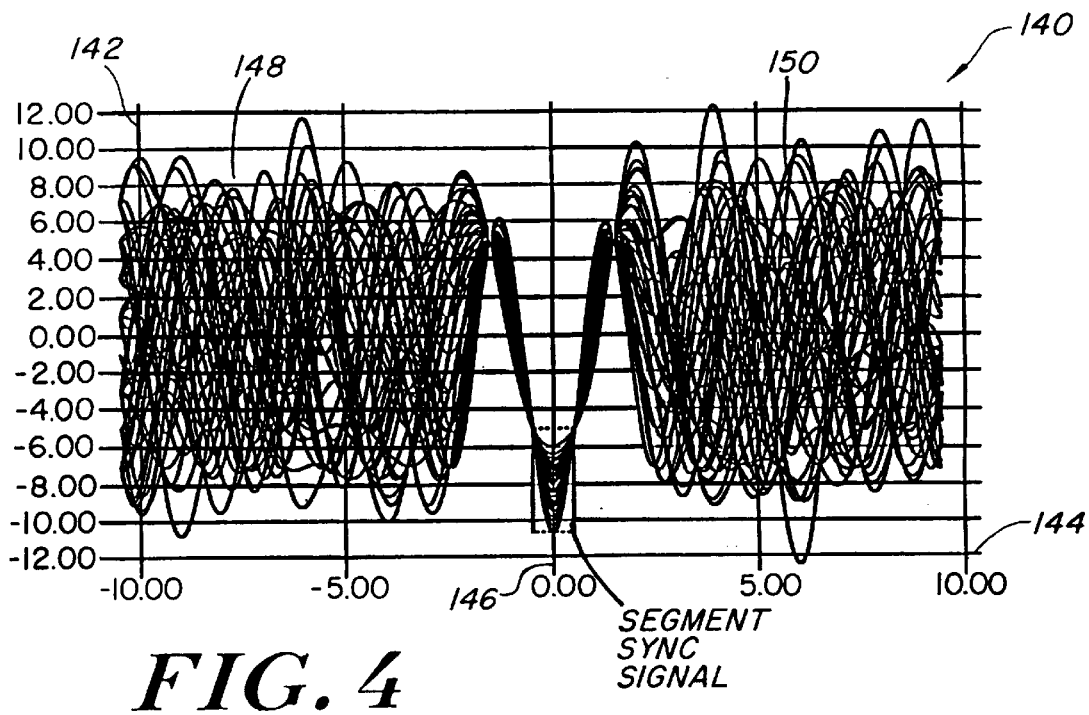
FIG. 4 illustrates a plot of fifty digitized data signals on the line 32 (FIG. 3) that have been overlayed and plotted as a function of time.

FIG. 4 illustrates a plot 140 of fifty signal segments that have been overlayed and plotted as a function of time. The signal levels are plotted along a vertical axis 142 and time is plotted along a horizontal axis 144. Significantly, each of the signal segments includes a VSB-8 segment sync signal that is centered around zero 146 on the horizontal axis (i.e., time). On either side of each segment sync signal are data fields 148, 150. Notably, at zero 146 on the horizontal axis, the sync signal segment values vary between about −10.5 and −6.

Figure 5:
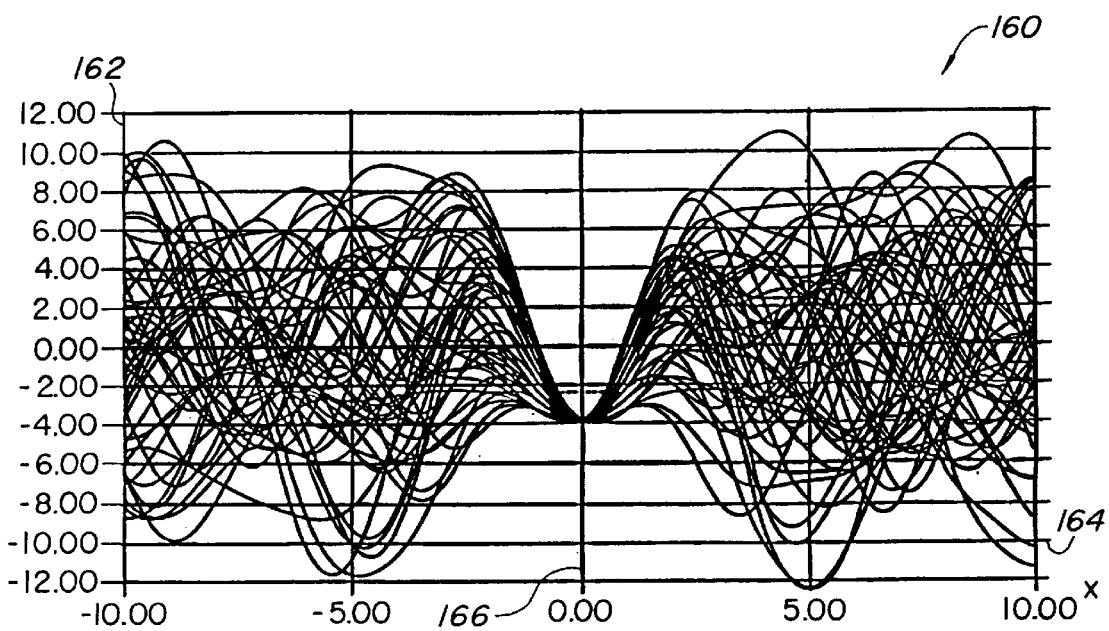
FIG. 5 illustrates a plot of fifty filtered signal segments on the line 104 (FIG. 3) that have been overlayed and plotted as a function of time.

FIG. 5 illustrates a plot 160 of fifty filtered signal segments on the line 104 (FIG. 3) that have been overlayed and plotted as a function of time. The filtered signal values are plotted along a vertical axis 162 and time is plotted along a horizontal axis 164. As a result of the filter 102 (FIG. 3), the filtered segment sync signal values now vary between about −4 and −3.5 at zero 166 on the horizontal axis 164. Notably, the filter 102 (FIG. 3) has significantly narrowed the variance of the VSB-8 segment sync signal values which facilitates improved detection of the sync sequence. We shall now discuss the filter 102.

The function of the filter 102 is to facilitate identifying the location of the segment sync signal in the signal segment. The filter is preferably a finite-impulse-response (FIR) filter with at least four taps. The filter is designed to keep the filtered signal value relatively constant throughout the time period associated with the segment sync signal. That is, the variance of the filtered signal during the period of time associated with the segment sync value, should be reduced/minimized.

The result of the digital filtering can be represented as:

$$\mu = \sum_{k=-L}^{c+L} h_k u_k \quad \text{(Eq. 2)}$$

where:
μ=the filtered signal value on the line 104;
$u_k$=the sampled signal values;

$h_k$=the filter tap values; and

L=the filter length.

The signal $u_k$ represents samples of a contiguous band constrained signal which is the result of the interpolation of the original signal sequence $x_j$ with an interpolation core g (e.g., a raised cosine function). With $x_i$ representative of the original signal and g representative of the interpolation core, $\mu_k$ can be expressed as:

$$u_k = \sum_{j=-\infty}^{j=\infty} x_{k-j} g(j + \varphi) \quad \text{(Eq. 3)}$$

where φ is equal to the sampling phase. Assume that the segment sync sequence of length c+1 is $\{s_o, \ldots, s_c\}$ and that the rest of the $x_k$'s are zero-centered. Therefore, we can say:

$x_k = s_k$ if $0 \leq k \leq c$ $E(x_k) = 0$ otherwise

The result of the filtering is a function of the actual phase φ, so Eq. 2 can be rewritten as:

$$\mu(\varphi) = \sum_{k=-L}^{k=c+L} \sum_{j=-\infty}^{j=\infty} h_k x_j g(k - j + \varphi) \quad \text{(Eq. 4)}$$

Taking the segment sync sequence into account, Eq. 4 can be rewritten as:

$$\mu(\varphi) = \sum_{k=-L}^{c+L} \sum_{j=0}^{c} h_k s_j g(k - j + \varphi) + \sum_{k=-L}^{c+L} \sum_{j \notin [0,c]} h_k x_j g(k - j + \varphi) \quad \text{(Eq. 5)}$$

Since the average $E(x_k)$ is equal to zero outside the sync sequence, from Eq. 5 we get the following equation:

$$\hat{\mu}(\varphi) = E(\mu(\varphi)) = \sum_{k=-L}^{c+L} \sum_{j=0}^{c} h_k s_j g(h - j - \varphi) \quad \text{(Eq. 6)}$$

where the "^" symbol indicates an expected value. Averaging $\hat{\mu}(\phi)$ over φ produces:

$$\mu_0 = \frac{1}{\varphi_1 - \varphi_0} \sum_{k=-L}^{c+L} \sum_{j=0}^{c} h_k s_j \int_{\varphi_0}^{\varphi_1} g(k - j + \varphi) d\varphi \quad \text{(Eq. 7)}$$

For future needs we define matrix $H_{k,l}$ and sequence/vector $G_k$ as:

$$H_{k,l} = \frac{1}{\varphi_1 - \varphi_0} \int_{\varphi_0}^{\varphi_1} g(k + \varphi) g(l + \varphi) d\varphi \quad \text{(Eq. 8)}$$

$$G_k = \frac{1}{\varphi_1 - \varphi_0} \int_{\varphi_0}^{\varphi_1} g(k + \varphi) d\varphi \quad \text{(Eq. 9)}$$

where:

$G_k$ is an average (over all possible sampling phases) of the sampled modulation function (raised cosine in the case of VSB-8); and $H_{k,l}$ is the average (again, over all phases) of the auto-correlation matrix of the same modulation function.

Using these equations, we can rewrite Eq. 7 as:

$$\mu_0 = \sum_{k=-L}^{c+L} \sum_{j=0}^{c} G_{k-j} h_k s_j \quad \text{(Eq. 10)}$$

We can also write the expression for $\mu_0^2$ as:

$$\mu_0^2 = \sum_{k=-L}^{c+L} \sum_{l=-L}^{c+L} \sum_{j=0}^{c} \sum_{i=0}^{c} G_{k-j} G_{l-i} h_k h_l s_j s_i \quad \text{(Eq. 11)}$$

To compute the variance, Eq. 6 is squared which yields:

$$\mu^2(\varphi) = \sum_{k=-L}^{c+L} \sum_{l=-L}^{c+L} \sum_{j=0}^{c} \sum_{i=0}^{c} h_k h_l s_j s_i g(k - j + \varphi) g(l - i + \varphi) + \quad \text{(Eq. 12)}$$

$$\sum_{k=-L}^{c+L} \sum_{l=-L}^{c+L} \sum_{j=0}^{c} \sum_{i \notin [0,c]} h_k h_l s_j x_i g(k - j - \varphi) g(l - i - \varphi) +$$

$$\sum_{k=-L}^{c+L} \sum_{l=-L}^{c+L} \sum_{j \notin [o,c]} \sum_{i \notin [0,c]} h_k h_l x_j g(k - j + \varphi) g(l - i + \varphi)$$

By exploiting zero-symmetry of the original signal sequence $x_k$, we get a slightly simpler expression for the expectation of $\mu^2$, $E(\mu^2(\phi))$ which can be written as:

$$E(\mu^2(\varphi)) = \sum_{k=-L}^{c+L} \sum_{l=-L}^{c+L} \sum_{j=0}^{c} \sum_{i=0}^{c} h_k h_l s_j s_i g(k - j - \varphi) g(l - i + \varphi) + \quad \text{(Eq. 13)}$$

$$\sum_{k=-L}^{c+L} \sum_{l=-L}^{c+L} \sum_{j \notin [0,c]} h_k h_l E_2 g(k - j - \varphi) g(l - i + \varphi)$$

where $E_2 = E(x_k^2)$, and $E(x_k^2)$ does not depend on k. However, the non-zero symmetry case can be reduced to the symmetric case by shifting by an average value. The expectation value $E(\mu^2(\phi))$ is averaged over the full range of φ, which provides:

$$E(\mu^2) = \frac{1}{\varphi_1 - \varphi_0} \int_{\varphi_0}^{\varphi_1} E(\mu^2(\mu)) d\varphi \quad \text{(Eq. 14)}$$

Using Eqs. 8 and 9, Eq. 14 can be rewritten as:

$$E(\mu^2) = \sum_{k=-L}^{c+L} \sum_{l=-L}^{c+L} \sum_{j=0}^{c} \sum_{i=0}^{c} h_k h_l s_j s_i H_{k-j,l-i} + \quad \text{(Eq. 15)}$$

$$E_2 \sum_{k=-L}^{c+L} \sum \sum \sum h_k h_l H_{k-j,l-j}$$

We can now compute the variance $V_0$, which can be expressed as:

$$V_0 = E(\mu^2) - \mu_0^2 \quad \text{(Eq. 16)}$$

Substituting for $E(\mu^2)$ and $\mu_0^2$, $V_0$ can be expressed as:

$$V_0 = \sum_{k=-L}^{c+L} \sum_{l=-L}^{c+L} \sum_{j=0}^{c} \sum_{i=0}^{c} h_k h_l s_j s_i H_{k-j,l-i} + \quad \text{(Eq. 17)}$$

$$E_2 \sum_{k=-L}^{c+L} \sum_{l=-L}^{c+L} \sum_{j \notin [0,c]} h_k h_l H_{k-j,l-j} -$$

$$\sum_{k=-L}^{c+L} \sum_{l=-L}^{c+L} \sum_{j=0}^{c} \sum_{i=0}^{c} h_k h_l s_j s_i G_{k-j} G_{l-i}$$

Thus, the variance $V_0$ is a quadratic form of $h_k$:

$$V_0 = \sum_{k=-L}^{c+L} \sum_{l=-L}^{c+L} B_{k,l} h_k h_l \quad \text{(Eq. 18)}$$

where $$B_{k,l} = \sum_{j=0}^{c} \sum_{i=0}^{c} s_j s_i H_{k-j,l-i} + E_2 \sum_{j \notin [0,c]} H_{k-j,l-j} - \quad \text{(Eq. 19)}$$

$$\sum_{j=0}^{c} \sum_{i=0}^{c} G_{k-j} G_{l-i} s_j s_i$$

To find the location of the segment sync signal, we want to minimize the value of $V_0$ subject to a constraint on the value of the tap weights $h_k$ in order to eliminate the trivial solution of $h_k=0$. By constraining the power of $h_k$ to:

$$\sum_k h_k^2 = 1 \quad \text{(Eq. 20)}$$

the problem is reduced to the minimization of quadratic forms on a unit sphere. Therefore, the solution is computed by finding the smallest eigenvalue of the matrix $B_{k,l}$. The corresponding eigenvector provides the solution, while the eigenvalue is equal to the optimal value. In general, it is contemplated that the detection apparatus and method may be used on virtually any signal which employs a sync signal in a bit stream. Mathematically, we can express a general solution which is applicable to both real and complex value signals as (note, the bar over a variable (e.g., $\bar{g}$) indicates a complex conjugate):

$$H_{k,l} = \frac{1}{\varphi_1 - \varphi_0} \int_{\varphi_0}^{\varphi_1} g(k + \varphi) \bar{g}(l + \varphi) d\varphi \quad \text{(Eq. 21)}$$

$$B_{k,l} = \sum_{j=0}^{c} \sum_{i=0}^{c} s_j \bar{s}_i (H_{k-j,l-i} - G_{k-j} \bar{G}_{l-i}) + E_2 \sum_{j \notin [0,c]} H_{k-j,l-i} \quad \text{(Eq. 22)}$$

$$V_0 = \sum_{k=-L}^{c+L} \sum_{l=-L}^{c+L} B_{k,l} h_k \bar{h}_l \quad \text{(Eq. 23)}$$

Table 1 representative tap weights for a sixteen-tap FIR filter $F_{16}$ and a four-tap FIR filter $F_4$.

TABLE 1

| TAPS | $F_{16}$ | $F_4$ |
|---|---|---|
| $h_{-7}$ | 0.003417283776061 | — |
| $h_{-6}$ | -0.004253206872528 | — |
| $h_{-5}$ | 0.005423414412827 | — |
| $h_{-4}$ | -0.007226877861294 | — |
| $h_{-3}$ | 0.010420286086521 | — |
| $h_{-2}$ | -0.016384670222753 | — |
| $h_{-1}$ | 0.2795011686112476 | 0.273114849155525 |
| $h_0$ | 0.649145881102378 | 0.652233312960086 |
| $h_1$ | 0.649145854209076 | 0.652233287129632 |
| $h_2$ | 0.279501690935998 | 0.273114854586751 |
| $h_3$ | -.016384666524685 | — |
| $h_4$ | 0.010420291102195 | — |
| $h_5$ | -0.007226881554300 | — |
| $h_6$ | 0.005423417408146 | — |
| $h_7$ | -0.004253209383952 | — |
| $h_8$ | 0.003417285897808 | — |

The eigenvalues for the four-tap filter are 0.1009, and 0.0856 for the sixteen-tap filter. Notably, since a substantial portion of the energy for the sixteen-tap filter is contained in the four central taps (i.e., $h_1$, $h_0$, $h_1$, and $h_2$), the performance between the four and sixteen-tap filter is not substantially different. Advantageously, the filter 102 (FIG. 3) facilitates faster segment sync signal detection by applying tighter constraints on the filtered values in the sync region. Significantly, these tighter constraints result in the signal values outside the sync region having a lower probability of satisfying sync signal detection criteria, thus reducing the probability of an erroneous sync signal detection.

As discussed above, to determine the location of the segment sync signal 40 in the signal segment, the smallest value stored in the plurality of locations in the accumulator 126 is located. The smallest value is representative of the center of the segment sync signal 40 (FIG. 2). Since the segment sync signal has a known fixed length, an offset is subtracted from the location of the smallest value to determine the starting point of the segment sync signal 40. Similarly, the starting point of the data field 41 is also easily located.

Figure 6:
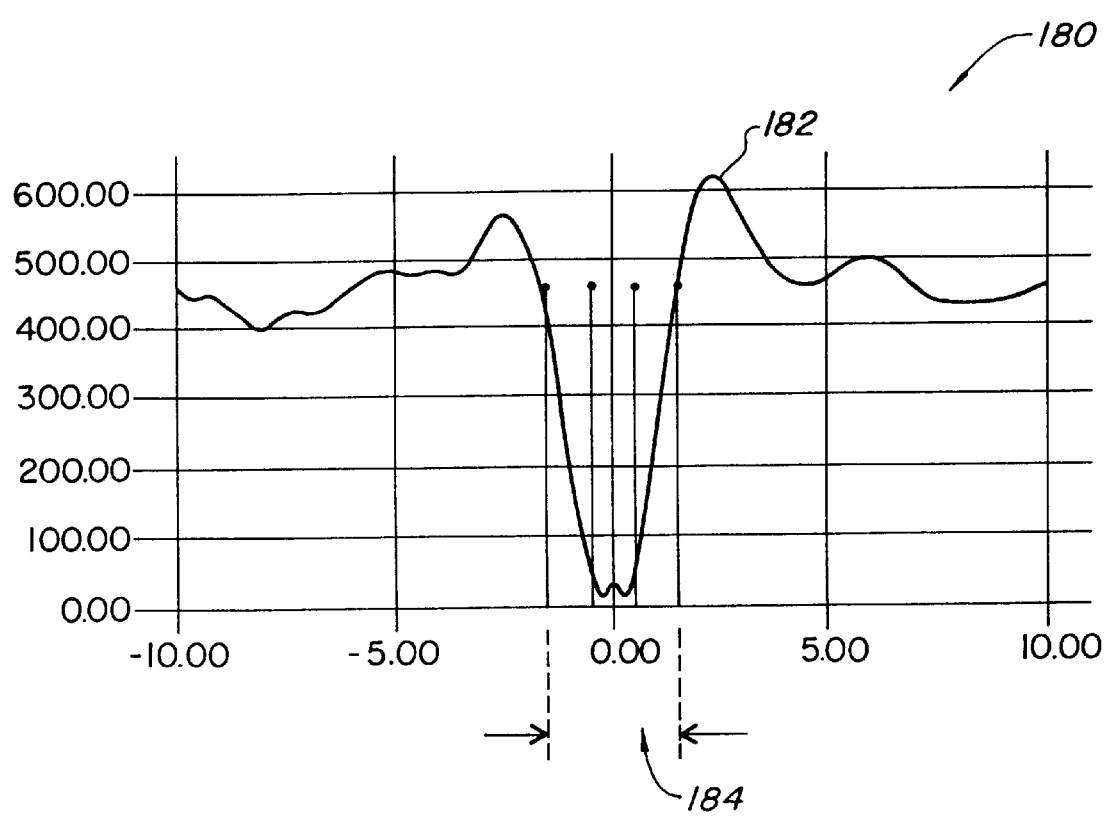
FIG. 6 illustrates a plot of a filtered signals summed over a plurality of segments in the region of the segment sync signal.

FIG. 6 illustrates a plot 180 of filtered signals summed over a plurality of segments in the region of the segment sync signal to provide a summed signal value 182 that is stored in the accumulator 126 (FIG. 3). Notably, the filtered data signal 182 has a well defined region 184 which is identifiable as the segment sync signal.

Once the smallest value $S_{no}$ stored in the plurality of locations in the accumulator 126 is located, an initial phase estimate $\phi_0$ can be computed. The initial phase estimate $\phi_0$ is used to adjust the phase of the ADC 30 (FIG. 3), and is computed using the following expression:

$$\phi_0 = A^*(S_{no-1} - S_{no+1}) \quad \text{(Eq. 24)}$$

where:

A=constant;

$S_{no-1}$=the sampled value in the accumulator immediately prior to the smallest value; and $S_{no+1}$=the sampled value in the accumulator immediately after the smallest value.

Figure 7:
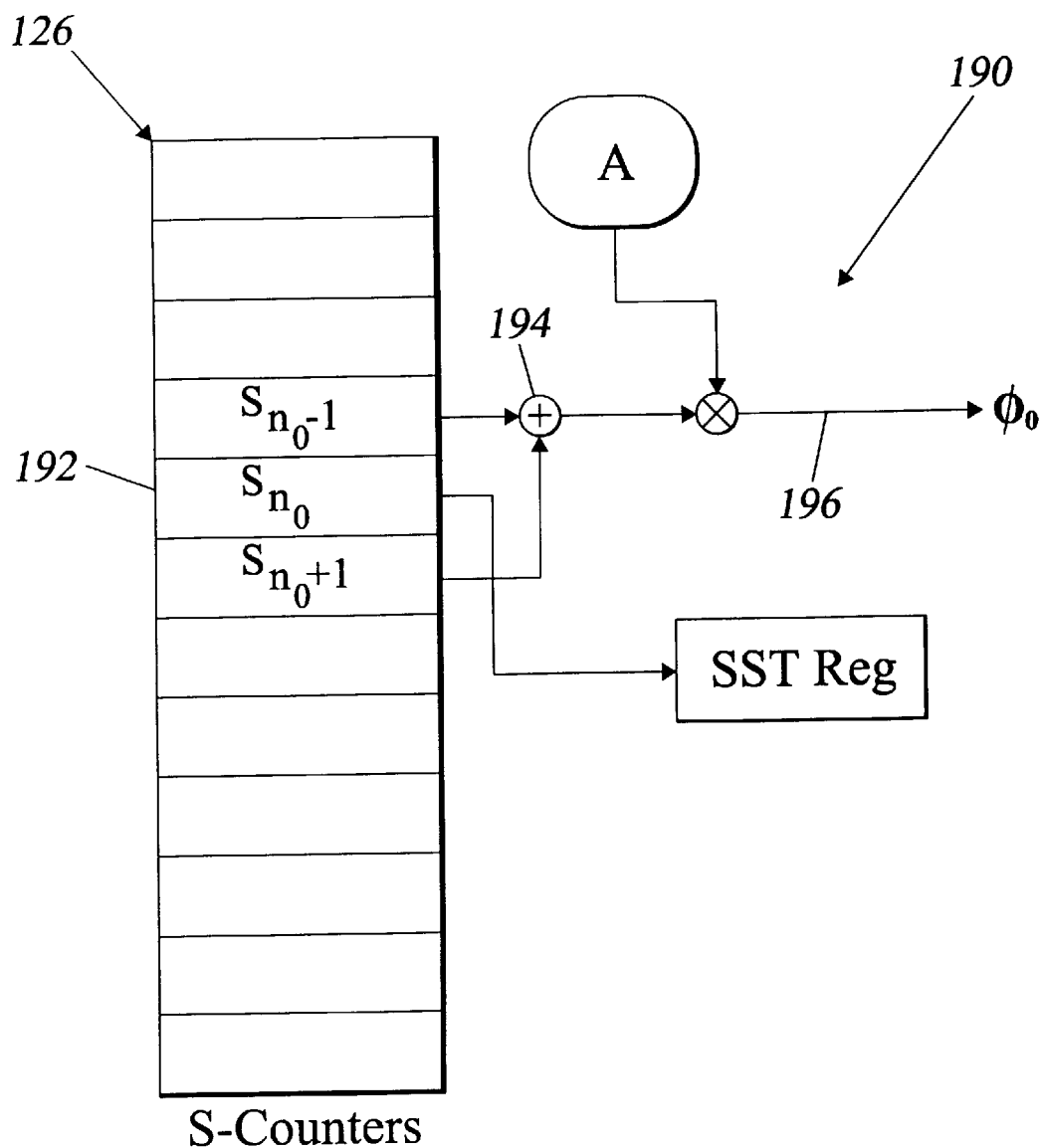
FIG. 7 illustrates a functional block diagram for computing the initial phase estimate $\phi_0$.

FIG. 7 illustrates a functional block diagram 190 of the computation of the initial phase estimate $\phi_0$. The accumulator 126 includes the smallest absolute value indicative of a location 192 which contains the smallest absolute value $S_{n0}$. A summer 194 computes a difference between values stored adjacent to the smallest absolute value $S_{n0}$, and the difference is multiplied by a constant A and the resultant product on line 196 is indicative of the initial phase estimate $\phi_0$. The constant A represents a scaling factor that was computed empirically by simulating the synchronization signal detection and phase estimation apparatus and method. In one embodiment A is equal to (0.055)/K, where K is equal to the number of segments (e.g., fifty). These values assume the symbols range from −7 to 7 (i.e., −7, −5, −3, −1, +1, +3, +5 and +7 for VSB-8) and a four-tap filter is used.

Once the segment sync signal has been detected and the initial estimate of the sampling phase is computed, the phase estimate is regularly computed to keep the sampling phase of the ADC 30 adjusted.

The present invention has been discussed in the context of segment sync detection in a DTV receiver. However, one of ordinary skill will recognize that the detection technique set forth above may be used in communication systems other than DTV. In addition, the present invention is clearly not limited to systems that receive 828 symbols during a segment, or to a four symbol segment sync signal.

Advantageously, robust segment sync signal detection and initial phase estimation speeds up the recovery of data in a DTV receiver.

Although the present invention has been shown and described with respect to several preferred embodiments thereof, various changes, omissions and additions to the form and detail thereof, may be made therein, without departing from the spirit and scope of the invention.

What is claimed is:

1. A synchronization signal detector which receives an input signal that includes a segment sync sequence, the detector comprising:
    a filter that filters the input signal and provides a filtered signal indicative thereof, wherein said filter filters the input signal sequence such that the variance of said filtered signal in the temporal period associated with the segment sync sequence is substantially reduced;
    a memory device;
    means for regularly computing the difference between said filtered signal and a constant value and providing a difference value indicative thereof, for computing the absolute value of the difference, for summing said absolute value with an associated value stored in said memory device and providing a summed signal indicative of the sum, and for storing said summed signal value in said memory device; and
    a comparator for comparing a plurality of summed values in said memory device to identify the smallest absolute value which is indicative of the location of the segment sync sequence in the input signal stream.

2. The synchronization signal detector of claim 1, wherein said filter is a finite impulse response (FIR) digital filter.

3. The synchronization signal detector of claim 2, wherein said FIR digital filter comprises a plurality of tap weights and the sum of each tap weight squared is about one.

4. The synchronization signal detector of claim 3, wherein said FIR digital filter includes at least four taps.

5. The synchronization signal detector of claim 4, wherein the input signal is a digital television input signal which is encoded using a vestigial sideband (VSB) format.

6. The synchronization signal detector of claim 4, wherein said input signal is a digital television input signal which is encoded using amplitude modulation.

7. The synchronization signal detector of claim 1, further comprising means for computing an initial sampling phase estimate using absolute value signals adjacent to said smallest absolute value.

8. The synchronization signal detector of claim 1, further comprising a phase estimator that computes an initial sampling phase estimate using absolute value signals adjacent to said smallest absolute value.

9. The method of detecting a segment sync sequence within an input signal sequence, the method comprising the step of:
    filtering the input signal sequence and providing a filtered signal indicative thereof;
    computing the difference between said filtered signal and a constant value and providing a difference signal value indicative thereof;
    computing an absolute value of the difference signal value and providing an absolute value indicative thereof;
    summing said absolute value with an associated value stored in a memory device to provide a summed value, and storing said summed value in a memory device; and
    comparing a plurality of said summed values to identify the smallest said absolute value which is indicative of the location of the segment sync sequence in the input signal sequence.

10. The method of claim 9, wherein said method further comprising the step of repeating said steps of filtering, regularly computing the difference, computing an absolute value and summing, prior to said step of comparing.

11. The method of claim 9, wherein said step of filtering comprises the step of filtering with a finite impulse response (FIR) digital filter which comprises a plurality of taps each having an associated tap weight value, wherein the sum of each tap weight squared is equal to about one.

12. The method of claim 9, wherein said step of filtering comprises the step of filtering with a finite impulse response (FIR) digital filter, such that the variance of said filtered signal in a temporal period associated with the sync signal sequence is substantially reduced.

13. The method of claim 9, wherein the input signal sequence is a digital television input signal which is encoded using a vestigial sideband (VSB) format.

14. The method of claim 9, wherein the input signal sequence is a digital television input signal which is encoded using amplitude modulation.

15. The method of claim 9, further comprising the step of computing an initial phase estimate using signals values temporally before and after said smallest said absolute value, wherein said initial phase estimate is used control an analog-to-digital conversion of the input signal.

16. A method of detecting a synchronization signal sequence that separates data fields within an incoming data stream to accurately receive the data within the incoming digitized data stream, the method comprising the steps of:
    filtering the incoming digitized data stream to provide a filtered data stream comprising a plurality of sampled values;
    computing a difference between each of said plurality of sampled values and a constant value and providing a plurality of difference signals indicative thereof;
    computing the absolute value of each of said plurality of difference signal values to provide absolute value difference signal values indicative thereof;
    summing each of said absolute value differences signals with an associated prior absolute value difference signal and storing the resultant summed signal value; and
    comparing each of said resultant summed signal values to identify the smallest resultant summed signal value indicative of the location of the segment synchronization sequence in the incoming data stream.

17. The method of claim 16, wherein said step of filtering includes filtering the incoming data stream with a FIR filtering comparing a plurality of filter taps each having an associated tap weight, wherein the sum of each taps weight squared is about equal to one.

18. The method of claim 16, further comprising the step of:

computing an initial phase estimate for a sampling phase to control an analog-to-digital converter (ADC) which samples an input signal to provide a signal indicative of said incoming digitized data stream.

19. A synchronization signal detector which receives an input signal that includes a segment sync sequence, the detector comprising:

means for processing the input signal to provide a processed signal such that the variance of said processed signal in the temporal period associated with the segment sync sequence is substantially reduced;

a memory device;

means for computing the difference between said processed signal and a constant value and providing a difference value indicative thereof, for computing the absolute value of the difference, for summing said absolute value with an associated value stored in said memory device and providing a summed signal value indicative of the sum, and for storing said summed signal value in said memory device; and means for determining the smallest summed signal value, which is indicative of the location of the segment sync sequence in the input signal stream.

20. The synchronization signal detector of claim 19, wherein said means for processing comprises a digital filter.

* * * * *